J. E. EVANS.
OIL GAUGE VALVE.
APPLICATION FILED SEPT. 15, 1921.
1,427,681.
Patented Aug. 29, 1922.
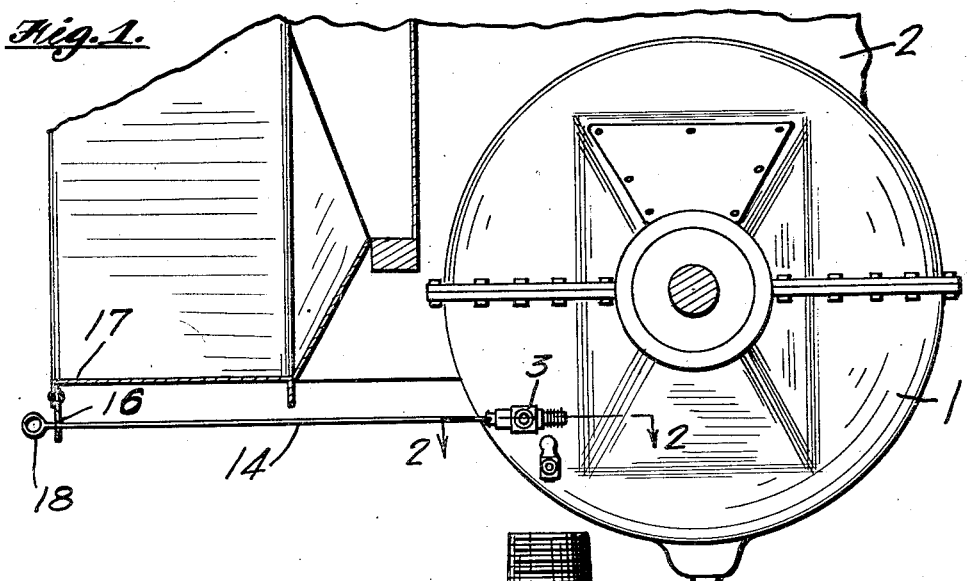
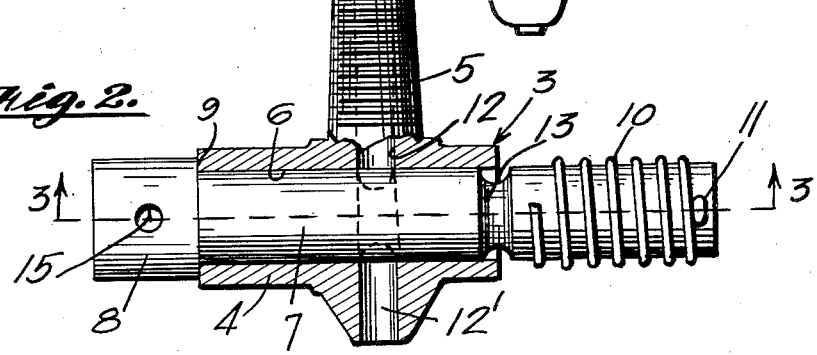
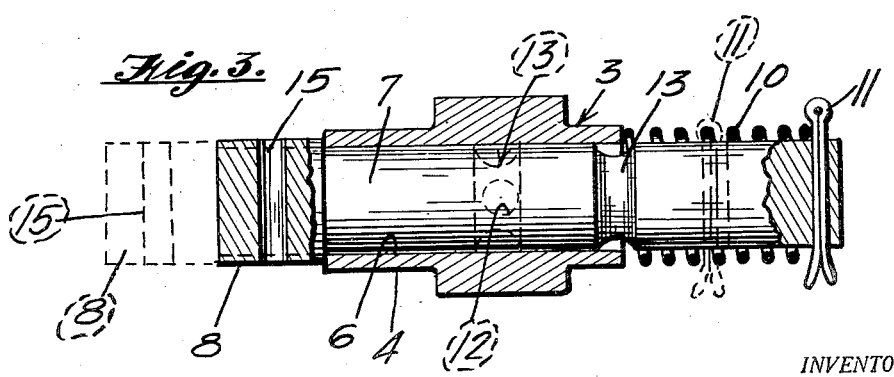
INVENTOR.
John E. Evans
BY Herman Miller
ATTORNEY.

UNITED STATES PATENT OFFICE.

JOHN E. EVANS, OF LOS ANGELES, CALIFORNIA, ASSIGNOR OF ONE-HALF TO EARL H. GOODWIN, OF LOS ANGELES, CALIFORNIA.

OIL-GAUGE VALVE.

1,427,681. Specification of Letters Patent. Patented Aug. 29, 1922.

Application filed September 15, 1921. Serial No. 500,860.

*To all whom it may concern:*

Be it known that I, JOHN E. EVANS, a citizen of the United States, residing at Los Angeles, in the county of Los Angeles and State of California, have invented new and useful Improvements in Oil-Gauge Valves, of which the following is a specification.

This invention relates to an oil gauge valve and more particularly to a type of valve having a body portion, a conduit in said portion and a slidably mounted closure stem which directly closes the conduit by the sliding action of the stem and it is the object of this invention to provide a crank case, within which an oil level must be maintained at or above a predetermined point, with a valve operated from the side of the vehicle carrying the crank case so that when the valve is actuated oil will flow out indicating that the oil is at least to its proper level.

As is well known with a certain type of automobile, to determine the oil level within the crank case it is necessary to reach under the car and open a petcock through which oil will flow after it is at or above the proper level, and my type of valve eliminates the necessity for getting beneath the automobile.

Other objects and advantages will be seen and the invention readily understood from the description of the accompanying drawings in which:

Fig. 1 is a fragmentary transverse section through an automobile taken behind the crank case.

Fig. 2 is a plan view shown in section with the closure stem allowing communication through the conduit shown in dotted line.

Fig. 3 is a section on line 3—3 of Fig. 2.

My valve is shown attached to the rear vertical side of the crank case 1 supported within the vehicle 2 and having the valve 3 positioned at a point on the crank case at which the oil level within the same must be at least maintained. The valve comprises substantially a longitudinal body portion 4 having a nipple 5 extending laterally therefrom and adapted to be screw threaded in the crank case 1. The body portion 4 has a longitudinal bore 6 which can be made tapered or any other suitable means used so as to make the valve leak proof when the same is closed. Slidably mounted in the bore 6 is the closure stem 7 projecting beyond at one end and having an enlarged portion 8 formed thereon so as to form a shoulder 9 adapted to abut the end of the body portion and limit the movement of the stem. The other end of the stem projects beyond the body portion in the opposite direction upon which is mounted a coiled spring 10 abutting the end of the body portion at one end and a cotter pin 11 at the other end, this spring normally keeping the valve closed.

Extending through the nipple 5 is a conduit 12 which terminates in the bore 6 and is then taken up again in a second conduit 12' which is diametrically opposed to the conduit 12 and which has communication with the same when an annular groove 13 formed in the stem is pulled back in alinement with the conduits as shown in dotted lines of Fig. 2. It is thus seen that the oil will flow from the crank case through the conduit 12 around groove 13 and out conduit 12' and will be visible to the person actuating the valve so that he will know that there is sufficient oil in the crank case.

The means for actuating the valve support comprises a rod 14 passing at one end through an aperture 15 in the head 8 and slidably supported in a bracket 16 depending preferably from the running board 17 and terminating in a handle portion 18 which may be readily grasped so as to open the valve and allow oil to flow out of the same.

Various changes in the details of construction of my invention may be made by those skilled in the art without departing from the spirit of the invention as set forth in the appended claims.

What is claimed is:

1. A valve comprising a body having a duct formed therein, a stem mounted for sliding movement in the body and transversely of the duct, said stem being formed at a point intermediate its ends with an annular channel, a head formed on one end of the stem, said stem being capable of occupying one extreme position in which the channel is in registration with the duct, and another extreme position in which the head engages the body and the channel is disposed substantially exteriorly of the body to allow of the cleaning thereof, and resilient means on the stem and engaging the body for normally urging the stem to the second extreme position.

2. In a valve structure for use in connection with the transmission case of an engine for determining the level of oil in the case, a body having a bore and a duct intersecting the bore, a nipple formed on the body adapted for engagement with the transmission case and interiorly communicating with said duct, a closure stem mounted for longitudinal sliding movement in the bore and provided intermediate its ends with an annular groove adapted to register with the duct for allowing the flow of oil from the nipple through the body portion, a head formed on one end of the stem for limiting the sliding movement of the stem in one direction, and a spring associated with the other end of the stem and engaging the body for normally urging the stem to a position in which the groove is out of registration with the duct and partly projected from the body and the head is in contact with the body.

In testimony whereof I have signed my name to this specification.

JOHN E. EVANS.